United States Patent [19]
Hasebe et al.

[11] Patent Number: 5,734,412
[45] Date of Patent: Mar. 31, 1998

[54] SCAN TYPE LASER MARKING DEVICE INCLUDING A SCANNING SPEED SETTING A DEVICE

[75] Inventors: Hiroyasu Hasebe, Hyogo; Makoto Sakai; Katsuhiko Yasui, both of Osaka, all of Japan

[73] Assignee: Keyence Corporation, Osaka, Japan

[21] Appl. No.: 341,210

[22] Filed: Dec. 5, 1994

[30] Foreign Application Priority Data

Dec. 3, 1993 [JP] Japan ................................. 5-064800
Dec. 8, 1993 [JP] Japan ................................. 5-340813

[51] Int. Cl.$^6$ ................................................. B41J 2/47
[52] U.S. Cl. ........................... 347/247; 358/296; 358/250
[58] Field of Search ................................. 347/247, 248, 347/237, 234; 358/296, 300, 302

[56] References Cited

U.S. PATENT DOCUMENTS

| | | |
|---|---|---|
| 4,285,012 | 8/1981 | Ohara et al. |
| 4,707,709 | 11/1987 | Tsilibes ................................. 347/247 |
| 4,852,020 | 7/1989 | Morita ................................. 364/521 |

FOREIGN PATENT DOCUMENTS

| | | |
|---|---|---|
| 0420198 | 4/1991 | European Pat. Off. ......... H04N 1/04 |
| 59-045091 | 3/1984 | Japan . |
| 05169286 | 7/1993 | Japan . |

OTHER PUBLICATIONS

Patent Abstracts of Japan, vol. 14 No. 32, JP-A-01 266749 (abstract).

Patent Abstracts of Japan, vol. 7 No. 141, JP-A-58 053444 (abstract).

*Primary Examiner*—Mark J. Reinhart
*Attorney, Agent, or Firm*—Sughrue, Mion, Zinn, Macpeak & Seas, PLLC

[57] ABSTRACT

A scan type laser marking device which scans the surface of an object conveyed in a predetermined area and applies a laser beam to the surface of the object to form a mark on the surface of the object, comprising an area storing section for storing the area; a start point coordinate storing section for storing coordinates of an irradiation start point in the area, the irradiation start point being located upstream relating to the direction of conveyance of the object; an end point coordinate storing section for storing coordinates of an irradiation end point in the area, the irradiation being located downstream relating to the direction of conveyance of the object; a mark reference point section for storing the coordinates of a reference point on the mark; and speed setting means for setting scanning speeds so that a marking operation is started when the mark reference point reaches the irradiation start point, and is ended when the mark reference point reaches the irradiation end point.

8 Claims, 8 Drawing Sheets

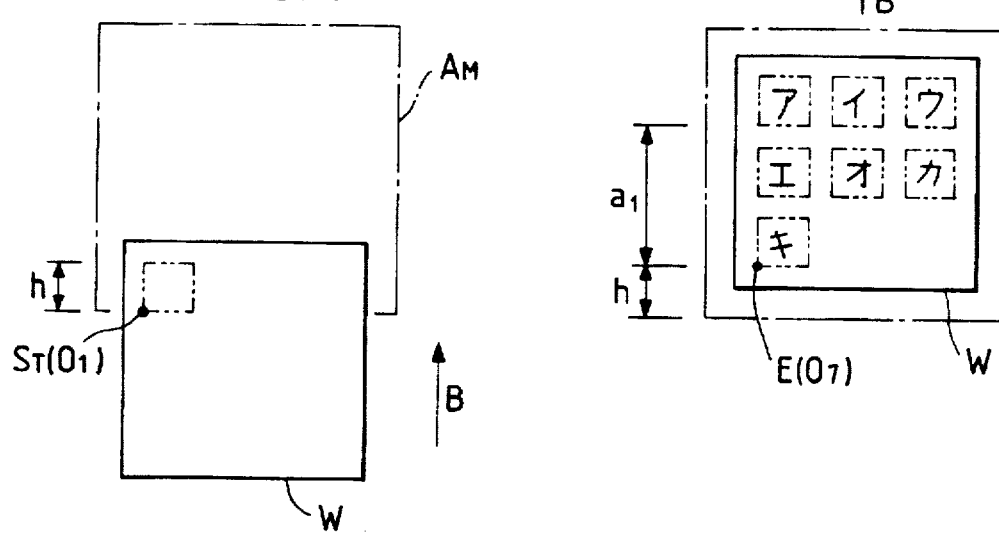
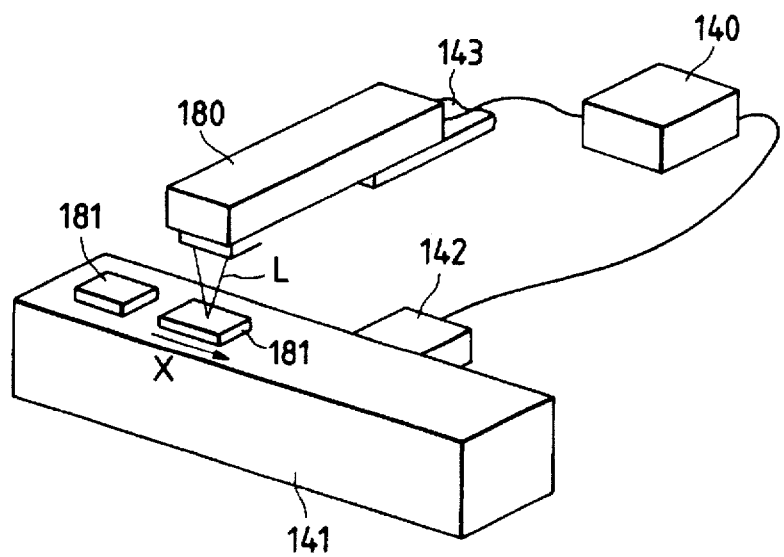
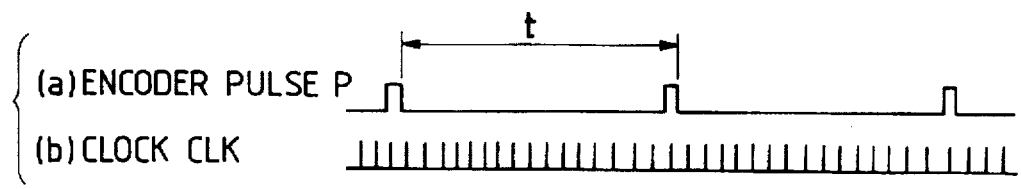

SCAN TYPE LASER MARKING DEVICE INCLUDING A SCANNING SPEED SETTING A DEVICE

BACKGROUND OF THE INVENTION

1. Field of Invention

This invention relates to laser marking devices which apply a laser beam to an object to form marks such as characters and symbols on it, and more particularly a scan type laser marking device.

2. Description of Prior Art

A scan type laser marking device outputs a laser beam in such a-manner that the laser beam is applied to the surface of an object such as an article or product while being deflected in a predetermined area in a scanning mode, for instance shown in Unexamined Japanese Patent Publication Sho. 64-11083. In a scan type laser marking device of this type, a conveyor is provided to convey objects successively. In this case, it is necessary to take the speed of the conveyor into consideration to determine the scanning speed; that is, it is necessary to accomplish the marking operation while the object is in the laser beam radiation area. However, it is difficult to set the scanning speed to a suitable value so that the laser beam irradiation time is fully utilized, and the scanning speed is generally higher than required.

If the scanning speed is high as was described above, then the spot of the laser beam is shifted from the aimed position because of a delay in response of the optical system. As a result, patterns such as characters and graphic forms marked on the object are blurred; that is, they are low in picture quality. In addition, the laser beam application time per area is decreased, and therefore it is necessary to increase the output of the laser.

In view of the foregoing, it is preferable to decrease the scanning speed as much as possible; in other words, it is preferable to decrease the scanning speed as much as possible unless a necessary marking operation is adversely affected thereby.

Another laser marking device has a laser source such as for instance a $CO_2$ laser. Roughly stated, the device operates as follows: The output laser beam of the $CO_2$ laser is applied to the surface of an object through a scanner made up of a galvano-mirror. Under this condition, the beam deflecting operation of the scanner is controlled with the aid of a computer so that a graphic form is described on the surface of the object.

For instance in the case where, as shown in FIG. 7, it is required to put a predetermined graphic form on an object 181 conveyed by a conveying stand 141 such as a belt conveyer, the conventional laser marking device of this type operates as follows: When the object 181, being conveyed by the conveying stand, comes under a marking head 180, the conveying stand 141 is stopped. Under this condition, the output laser beam of the marking head 180 is deflected both in the direction of X-axis and in the direction of Y-axis while being applied to the surface of the object 181.

In the case of the conventional laser marking device, the object must remain at rest while the mark is being formed on it. Therefore, in the case where it is required to put a pattern on a plurality of objects 181 one after another which are conveyed by the conveying stand 141, it is necessary to stop the conveying stand 141 for every object. This means that the device is low in productive efficiency.

SUMMARY OF THE INVENTION

Accordingly, an object of the invention is to solve the above-described problem. More specifically, an object of the invention is to provide a scan type laser marking device in which the scanning speed can be decreased as far as it permits a necessary marking operation; that is, it can be set to a suitable value.

Another object of the invention is to provide a laser marking device which is able to inscribe graphic forms on objects while moving the objects.

In order to achieve the above-described object, the present invention provides a scan type laser marking device which scans the surface of an object conveyed in a predetermined area and applies a laser beam to the surface of the object to form a mark on the surface of the object, the scan type laser marking device comprising: an area storing section for storing the area; a start point coordinate storing section for storing coordinates of an irradiation start point in the area, the irradiation start point being located upstream relating to the direction of conveyance of the object; an end point coordinate storing section for storing coordinates of an irradiation end point in the area, the irradiation being located downstream relating to the direction of conveyance of the object; a mark reference point section for storing the coordinates of a reference point on the mark; and speed setting means for setting scanning speeds so that a marking operation is started when the mark reference point reaches the irradiation start point, and is ended when the mark reference point reaches the irradiation end point.

Furthermore, in order to achieve the object, the invention provides a scan type laser marking device comprising: measuring means for measuring a time which is required for performing a marking operation with a reference scanning speed; and scanning speed calculating means for utilizing the time thus measured, a marking target time, and the reference scanning speed to calculate individual scanning speeds which are to be actually used.

Still further, to achieve the object, the invention provides a scan type laser marking device comprising: a maximum area storing section for storing a maximum area where a marking operation is allowed; a target area storing section for storing a target area smaller than the maximum area; and speed setting means for setting a scanning speed with which a marking operation is accomplished within the target area.

In order to achieve another object, the present invention provides a laser marking device that, comprises: a laser source; an optical scanning system for deflecting two-dimensionally a laser beam emitted by the laser source; a control system for controlling the operation of the optical scanning system; and means for inputting displacement data on a displacement of the object. The control system includes: coordinate producing means for producing coordinate data on a plurality of dots forming a graphic form; and coordinate correcting means for correcting, according to the displacement data, the coordinate data by the amount of the displacement of the object in the direction of displacement thereof. The coordinate correcting means provides corrected coordinate data which is applied to the optical scanning system.

The principle of the laser marking device of the present invention will be described with reference to FIGS. 3A to 3D.

It is assumed that a mark M of "アイウ" as shown in FIG. 3A is to be inscribed on a workpiece W with a laser beam. First, the coordinates of reference points $O_1$, $O_2$ and $O_3$ on the mark M (hereinafter referred to as "mark reference points $O_1$, $O_2$ and $O_3$," when applicable) are stored (cf. FIG. 3B). In addition, the coordinates of an irradiation start point $S_T$ in a target area $A_T$ which is located on the upstream side of the target area as viewed in the direction of movement of the workpiece W, are stored, and the coordinates of an irradiation end point E in the target area $A_T$ which is located on the downstream side of the target area are also stored. After the coordinates of points $O_1$, $O_2$, $O_3$, $A_T$ and M have been stored, the workpiece W is conveyed in the direction of the arrow B. In addition, a scanning speed is so determined that when the mark reference point $O_1$ located upstream as viewed in the direction of movement of the workpiece W, reaches the irradiation start point $S_T$, a marking operation is started. When the mark reference point $O_3$ located downstream reaches the irradiation end point E, the marking operation is ended. In this case, the marking operation is performed while the workpiece W moves a relatively long distance (a+b), and accordingly the scanning speed can be made slower than in the case where a scanning speed is fixedly set to a high value.

When the individual scanning speeds S are determined so that a marking operation is achieved within a time equal to the target time T, then the following Equation (1) is established between the target time T, the individual scanning speeds S, the measured time $T_0$, and the reference scanning speed $S_0$:

$$S \times T = S_0 \times T_0 \quad (1)$$

The target time T can be obtained from the following Equation (2), because it is the time which is required for the workpiece W to move across the target area $A_T$ at a conveying speed v as shown in FIGS. 3C and 3D:

$$T = (a+b)/v \quad (2)$$

Hence, the individual scanning speeds S can be obtained according to the above-described target time T, reference scanning speed $S_0$, and measured time $T_0$.

The target time T depends on the mark; however, by increasing the target time T as much as permitted, the individual scanning speeds S can be made lower than the reference scanning speed $S_0$.

The maximum area $A_M$, including the target area $A_T$, is larger than the latter. However, in the peripheral portion of the maximum area which is outside the target area $A_T$, the laser beam is applied obliquely, and therefore the distance from the spot of the laser beam is relatively long. Accordingly, in the peripheral portion of the maximum area, outside the target area $A_T$, the laser beam is not sufficiently focused, and the laser beam energy per unitary area is small. Hence, by accomplishing the marking operation while the workpiece is in the target area $A_T$; that is, by setting the scanning speed so that the marking operation is accomplished while the workpiece is in the target area $A_T$, a mark high in picture quality can be inscribed on the workpiece.

On the other hand, if the workpiece conveying speed varies, sometimes it is difficult to accomplish the marking operation while the workpiece is in the target area $A_T$. However, since the peripheral portion of the maximum area $A_M$ is provided outside the target area $A_T$, the marking operation can be achieved, although in this case the mark inscribed on the workpiece is somewhat low in picture quality. Hence, the scanning speed should be so determined that the marking operation is accomplished within the time which is required for the workpiece W to pass through the target area $A_T$. In this case, the scanning speed can be relatively low, and the marking operation can be achieved in the maximum area $A_M$ although the conveying speed of the workpiece W involves some variation.

Furthermore, according to the Laser marking device of the invention, scanning the surface of the object with the laser beam is carried out with the object being moved on. In this scanning operation, the displacement data on the displacement of the object is applied to the control system continuously.

On the other hand, the coordinate data provided by the coordinate producing means represent the relative coordinates of dots with respect to the object which is at rest.

In the case where the optical scanning system should deflect the laser beam in the direction of the X-axis (or the Y-axis) according to the coordinate data from the coordinate producing means, the X-axis coordinate value (or Y-axis coordinate value) of each of the dots forming the graphic pattern is corrected by the amount of the displacement of the object in the direction of the X-axis (or the Y-axis), so that the relative coordinate system of the object is transformed into an absolute coordinate system. Hence, by using coordinate data (corrected coordinate data) of the absolute coordinate system, a graphic pattern can be accurately inscribed on an object which is in motion.

With the laser marking device of the invention, a graphic form can be accurately inscribed on an object which is in motion. Thus, the device shows a high productive efficiency in marking a plurality of objects successively.

BRIEF DESCRIPTION OF THE DRAWINGS

FIGS. 6A and 6B are diagrams for a description of a marking method in the case where the direction of conveyance is changed.

FIG. 7 is a perspective view showing the whole arrangement of a laser marking device according to the invention.

FIG. 8 is a time chart showing an encoder pulse and a clock pulse employed in the device of the invention.

DETAILED DESCRIPTION OF THE PREFERRED EMBODIMENTS

Preferred embodiments of the invention will be described with reference to the accompanying drawings.

FIGS. 1 through 3D show a scan type laser marking device, which constitutes a first embodiment of the invention.

Figure 1:
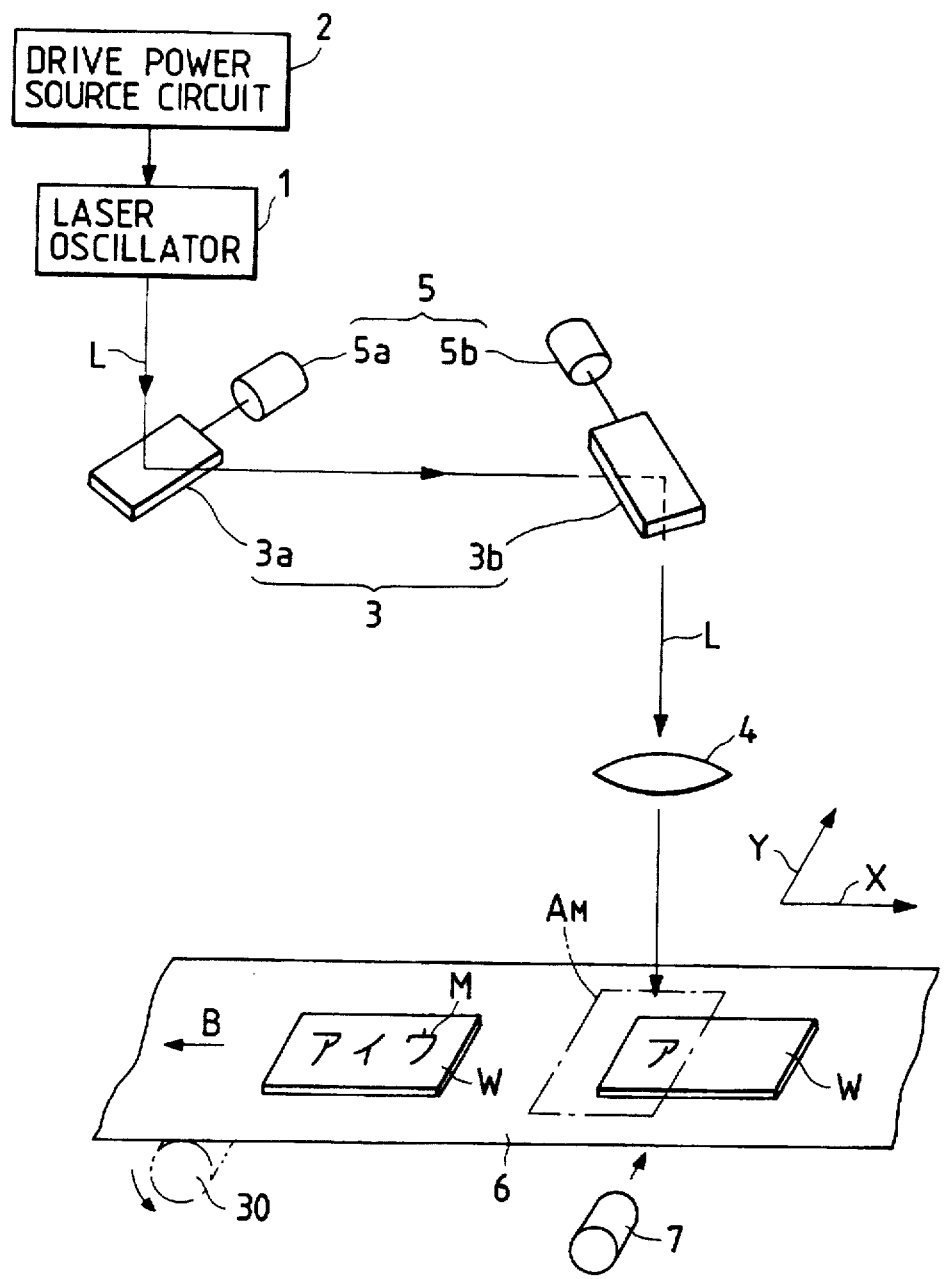
FIG. 1 is an explanatory diagram outlining the arrangement of a scan type laser marking device, which constitutes a first embodiment of the invention.

In FIG. 1, reference numeral 1 designates a laser oscillator which is for instance a $CO_2$ laser. The laser oscillator 1, when energized by a drive power source circuit 2, oscillates to emit a laser beam L. The laser beam L is reflected by a pair of galvano-mirrors $3a$ and $3b$, and applied through a condenser lens 4 to the surface of a workpiece (or an object) W. The galvano-mirrors $3a$ and $3b$ form a scanning optical system 3, and is driven by an optical system driving device 5 which is made up of a pair of galvano-meters $5a$ and $5b$. Thus, the laser beam L, while being deflected in a maximum irradiation area $A_M$ (hereinafter referred to as "a maximum area $A_M$", when applicable) in a scanning mode, is applied to the surface of the workpiece W which is being conveyed, so that the latter W is marked by the energy of the laser beam. The workpiece W is conveyed in the direction of the arrow B into the maximum area $A_M$ by a conveying device 6 such as a conveyor. When the workpiece W reaches the maximum area $A_M$ in this manner, it is detested by a workpiece detector 7.

Figure 2:
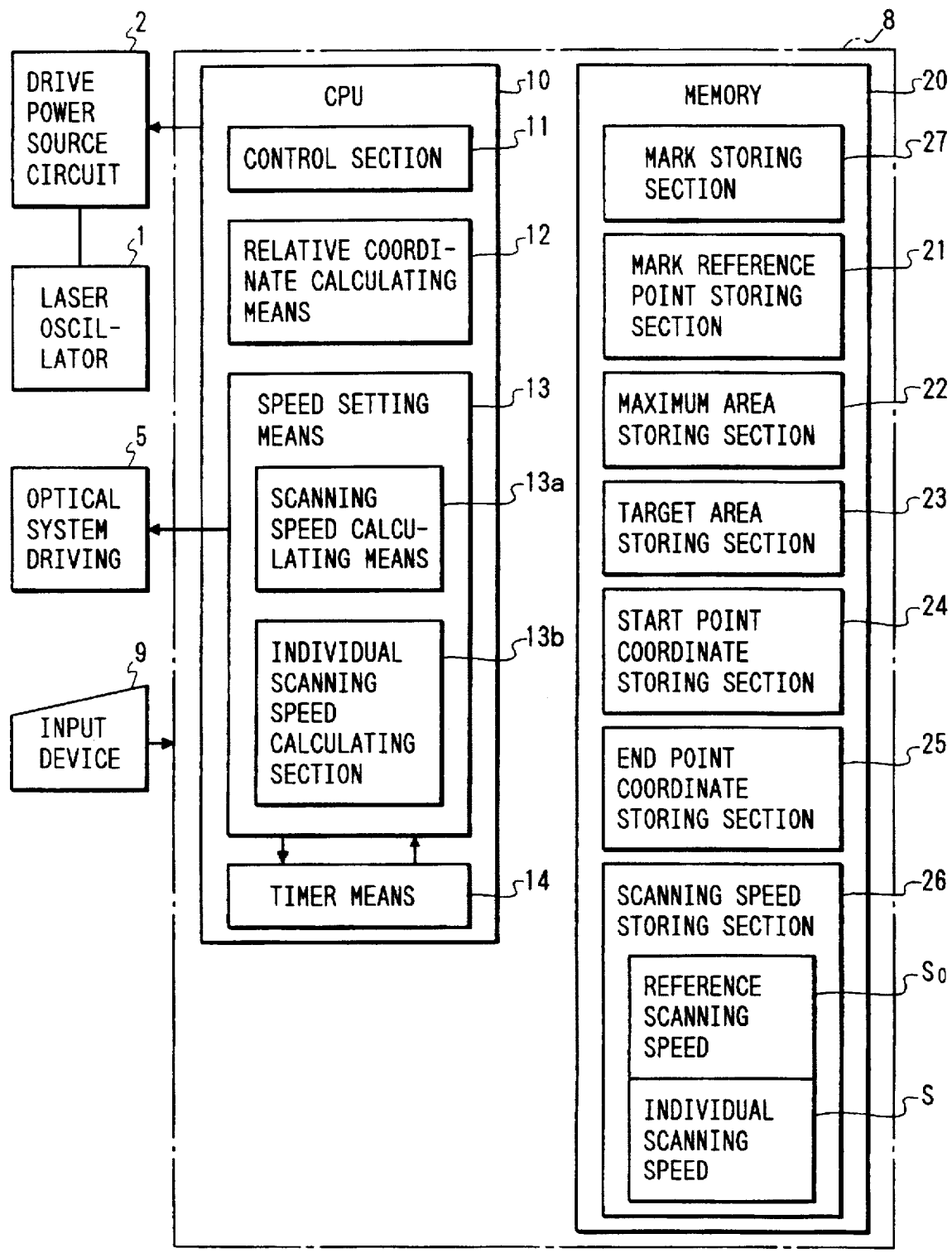
FIG. 2 is an explanatory diagram outlining the arrangement of a control device in the laser marking device.

As shown in FIG. 2, the laser marking device comprises: a control device 8 made up of a microcomputer; and an input device 9. The control device 8 includes a CPU 10, and memory means 20. The CPU 10 includes a control section 11, relative coordinate calculating means 12, speed setting means 13, and timer means (or measuring means) 14. The memory means 20 includes a mark storing section 27, a mark reference point storing section 21, a maximum area storing section 22, a target area storing section 23, a start point coordinate storing section 24, an end point coordinate storing section 25, and a scanning speed storing section 26. The control device 8 is coupled through an interface (not shown) to the input device 9.

Figure 3A:
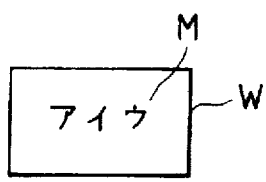
FIG. 3A is a plan view of a workpiece on which a mark is formed.
Figure 3B:
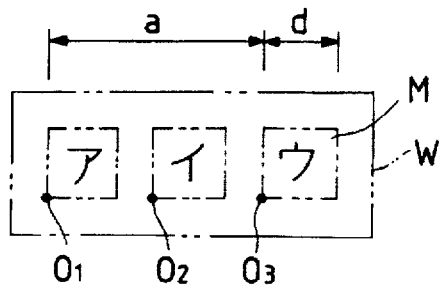
FIG. 3B is a plan view showing the mark in detail.

The coordinates representing the configuration of a mark M as shown in FIG. 3B, and the coordinates of reference points $O_1$, $O_2$ and $O_3$ of the mark M have been stored in the mark storing section 27 and the reference point storing section 21, respectively, being inputted by the input device 9 shown in FIG. 2.

Figure 3C:
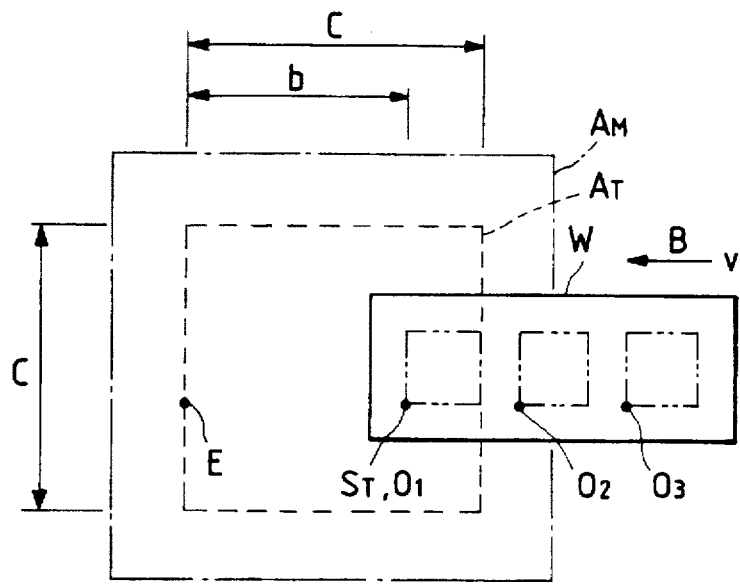
FIGS. 3C and 3D are plan views for a description of a marking operation of the laser marking device.

The coordinates of the maximum area $A_M$, in which a marking operation can be performed, have been stored in the maximum area storing section 22. On the other hand, a target area $A_T$ has been stored in the target area storing section 23. The target area, as shown in FIG. 3C, is included in the maximum area $A_M$, thus being smaller than the latter $A_M$. More specifically, the target area $A_T$ is for instance a square c×c, and it is coaxial with the maximum area $A_M$. In the target area, the laser beam is substantially accurately focused on the workplace, so that the mark formed on the latter is high in picture quality.

The coordinates of an irradiation start point $S_T$ in the maximum area $A_M$, located upstream as viewed in the direction of the arrow B in FIG. 3C, have been stored in the start point coordinate storing section 24 shown in FIG. 2. On the other hand, the coordinates of an irradiation end point E in the maximum area $A_M$, located downstream as viewed in the direction of the arrow B in FIG. 3C, have been stored in the end point coordinate storing section 25 shown in FIG. 2.

One reference scanning speed $S_0$, and a plurality of individual scanning speeds S have been stored in the scanning speed storing section 26 shown in FIG. 2. The reference scanning speed $S_0$ is set, for instance, to the maximum scanning speed of the marking device. The individual scanning speeds S are determined according to the kind of workpiece to be handled; that is, according to a mark to be inscribed on the workpiece, and are set by the speed setting means 13 as described later.

The relative coordinate calculating means 12 operates to transform the coordinates of the mark M and the mark reference points $O_1$, $O_2$ and $O_3$ shown in FIG. 3B, which are read out of the mark storing section 27 and the mark reference point storing section 21 respectively, into relative coordinates which are irradiated by the laser beam in the target area $A_T$ as shown in FIG. 3C. This coordinate transformation is carried out with the conveying speed v of the conveying device 6 (FIG. 1) taken into account. The control section 11 shown in FIG. 2 operates to control the drive power source circuit 2 and the optical system driving device 5 so that the laser beam L (FIG. 1) is applied to positions corresponding to the above-described relative coordinates with the individual scanning speed S or with the reference scanning speed $S_0$.

The speed setting means 13 has scanning speed calculating means 13a for calculating the individual scanning speeds S. That is, the speed setting means 13 operates to determine the individual scanning speeds S so that the marking operation is started when the mark reference point $O_1$ located upstream as viewed in the direction of conveyance in FIG. 3C reaches the irradiation start point $S_T$, and it is ended when the mark reference point $O_3$ located downstream as viewed in the same direction, reaches the irradiation end point E. In the embodiment, the speed setting means 13 (FIG. 2) determines the individual scanning speeds S so that the marking operation is accomplished while the workpiece is in the target area $A_T$ instead of the maximum area $A_M$.

Hereunder, a method of setting the individual scanning speeds S will be described concretely.

First, the reference scanning speed $S_0$ is read from the scanning speed storing section 26; and with the optical system driving device 5 operated, the time $T_0$ is measured which is required for inscribing the mark on the workpiece with the reference scanning speed $S_0$. The time $T_0$ is measured by the timer means 14. In this operation, the laser oscillator 1 preferably does not output a laser beam; however, it may output the laser beam as the case may be.

The marking operation is carried out during the period of time which elapses from the time instant that the upstream-side mark reference point $O_1$ of the workpiece W reaches the irradiation start point $S_T$, until the downstream-side mark reference point $O_3$ comes to the irradiation end point E. Hence, in the marking operation, the target time T can be determined according to the following Equation (2) described before):

$$T=(a+b)/v \quad (2)$$

where (a+b) is the amount of movement of the workpiece W during the marking operation, and (a+b)=a+c−d in which d is the maximum width of a character pattern.

In addition, the following Equation (1) is established between the above-described target time T, measured time $T_0$, individual scanning speed S, and reference scanning speed $S_0$:

$$S \times T = S_0 \times T_0 \quad (1)$$

The scanning speed calculating means 13a shown in FIG. 2 calculates the individual scanning speeds S according to the above-described Equations (1) and (2). The individual scanning speeds S thus calculated are stored in an individual scanning speed storing section 13b including registers. If necessary, the individual scanning speeds S are stored in the scanning speed storing section 26.

The laser marking device thus designed operates as follows:

Before a marking operation is started, individual scanning speeds S are obtained in the above-described manner. Thereafter, a workpiece W is conveyed in the direction of the arrow B by the conveying device 6 as shown in FIG. 1. When the workpiece W reaches the maximum area $A_M$, the workpiece detector 7 detects it, and applies a workpiece detection signal to the CPU 10 (FIG. 2) to allow the latter 10 to recognize the fact that the mark reference point $O_1$ has reached the irradiation start point $S_T$ as shown in FIG. 3C. That is, when, after the workpiece W enters the maximum area $A_M$, the upstream-side mark reference point $O_1$ reaches the irradiation start point $S_T$, the CPU activates the laser oscillator 1 with the aid of the drive power source circuit 2 (FIG. 2) to output the laser beam, and activates the scanning optical system 3 with the aid of the optical system driving device 5 to start the marking operation. In the marking operation, the CPU 10 reads the individual scanning speeds S from the scanning speed storing section 26, in advance and the CPU 10 selects one of the individual scanning speeds S which are suitable for the given workpiece W and the contents of the given mark (or mark pattern). Thus, the marking operation is started when the mark reference point $O_1$, located upstream as viewed in the direction of the arrow B in FIG. 3C, reaches the irradiation start point $S_T$, and the marking operation is ended when the mark reference point $O_3$ located downstream, reaches the irradiation end point E, as a result of which, for instance, a mark M of "アイウ" is inscribed on the workpiece W.

In the case where the marking operation is carried out by scanning only the central portion of the target area $A_T$ with the spot of the laser beam, the marking operation should be accomplished while the workpiece W moves approximately a distance of (a+d). On the other hand, with the laser marking device of the invention, the marking operation is started when the upstream-side mark reference point $O_1$ reaches the irradiation start point $S_T$, and it is ended when the downstream-side mark reference point $O_3$ reaches the irradiation end point E. Hence, during the marking operation, the amount of movement of the workpiece W is as long as (a+b); that is, the marking time T is as long as (a+b)/v, and the individual scanning speeds S can be decreased as much, with a result that the mark formed on the workpiece is high in picture quality.

Incidentally, it is considerably difficult for the operator to calculate the scanning speeds by himself at which the printing operation is accomplished within the target time T.

On the other hand, with the laser marking device of the invention, the timer means 14 (FIG. 2) measures the time $T_0$ which is required for a marking operation performed with the reference scanning speed, and the scanning speed calculating means 13a (FIG. 2) calculates according to the above-described Equations (1) and (2) the individual scanning speeds S which are required for inscribing a given mark. Hence, the individual scanning speeds S can be obtained with ease, and the printing operation can be carried out with the scanning speeds which are made sufficiently slow in correspondence to a given mark. Therefore, the resultant mark on the workpiece is high in picture quality.

It is not always necessary to obtain the target time T according to the aforementioned Equations (1) and (2); that is, it can be obtained by using the measured time $T_0$, the reference scanning speed $S_0$, and the individual scanning speeds S. In addition, with the error in speed of the conveying device taken into account, the individual scanning speeds S may be slightly higher than those which are obtained from Equations (1) and (2).

In the first embodiment, the target area $A_T$ is provided in the maximum area $A_M$, so that the marking operation is achieved merely by scanning the target area $A_T$ only. That is, with the laser marking device, as a rule, no marking operation is carried out when the workpiece is outside the target area $A_T$, being away from the center of the maximum area $A_M$. This means that the laser beam is well focused on the workpiece, and the resultant mark is fine in picture quality.

Figure 4A:
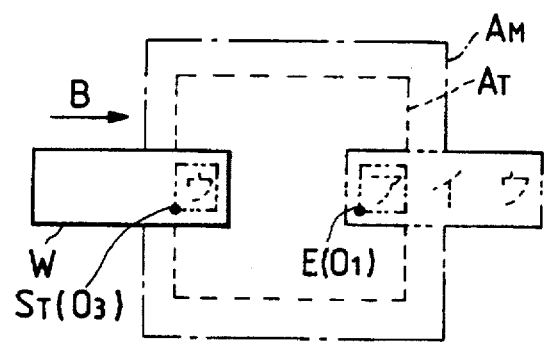
FIGS. 4A, 4B and 4C are plan views for a description of marking methods in the case where the direction of conveyance is changed and the mark is also changed.
Figure 4B:
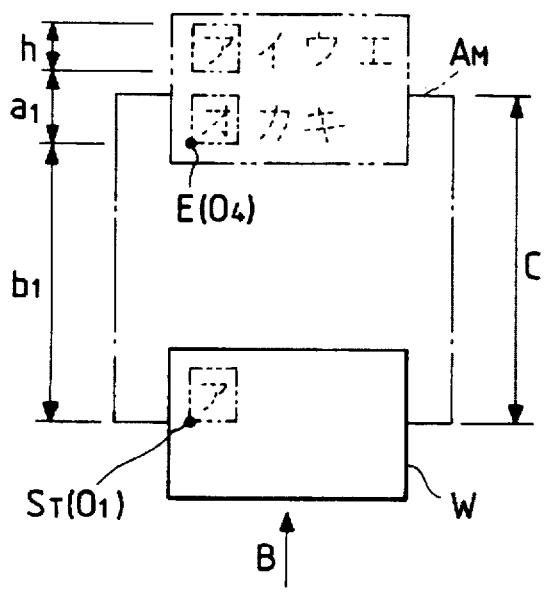
Figure 4C:
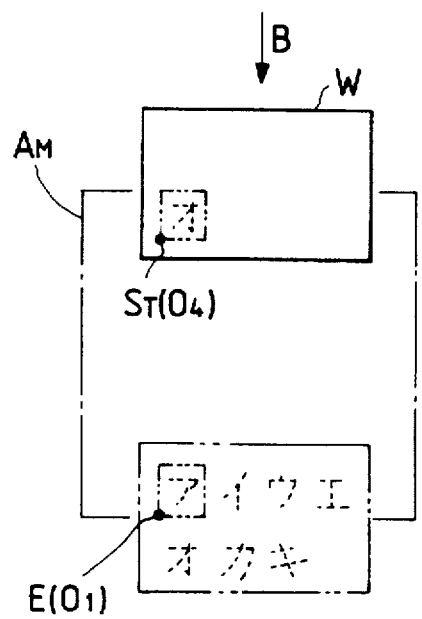

FIGS. 4A to 4C show modifications of the first embodiment, in which the direction of conveyance is changed.

FIG. 4A shows one of the modifications in which the direction of conveyance B is opposite to that in the case of FIGS. 3A to 3D. In the modification, the marking operation is started when the mark reference point $O_3$ reaches the irradiation start point $S_T$, and the marking operation is ended when the mark reference point $O_1$ reaches the irradiation end point E.

FIG. 4B shows another modification in which the direction of conveyance B forms 90° with that in the case of FIGS. 3A to 3D. In the modification, the marking operation is started when the mark reference point $O_1$ reaches the irradiation start point $S_T$, and the marking operation is ended when the mark reference point $O_4$ reaches the irradiation end point E. Further, in the modification shown, the individual scanning speeds S can be obtained from the following Equation (3):

$$S = S_0 \times T_0 \times \{v/(a_1+b_1)\} \qquad (3)$$

where $(a_1+b_1)$ is the amount of movement of the workpiece during the marking operation, and $(a_1+b_1)=a_1+c-h$ where h is the maximum height of a character pattern.

FIG. 4C shows another modification in which the direction of conveyance B is opposite to that in the modification shown in FIG. 4B. In the modification, the marking operation is started when the mark reference point $O_4$ reaches the irradiation start point $S_T$, and the marking operation is ended when the mark reference point $O_1$ reaches the irradiation end point E.

In the first embodiment, as shown in FIGS. 3A to 3D, the target area $A_T$ is provided in the maximum area $A_M$. However, as in the cases of the modifications shown in FIGS. 4B and 4C (corresponding to claims 1 and 2), the target area $A_T$ may be eliminated; that is, only the maximum area $A_M$ may be provided and stored.

Figure 5A:
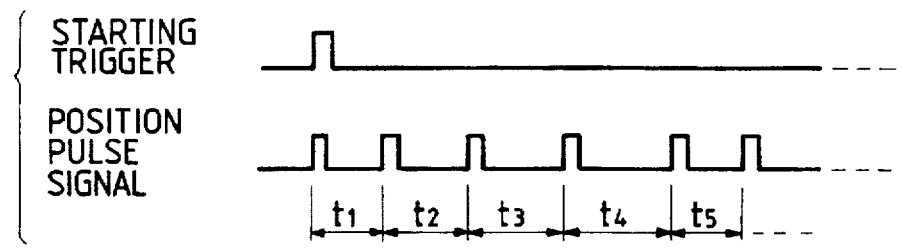
FIGS. 5A, 5B and 5C are diagrams for a description of a marking method in the case where the workpiece conveying speed is not uniform.
Figure 5B:
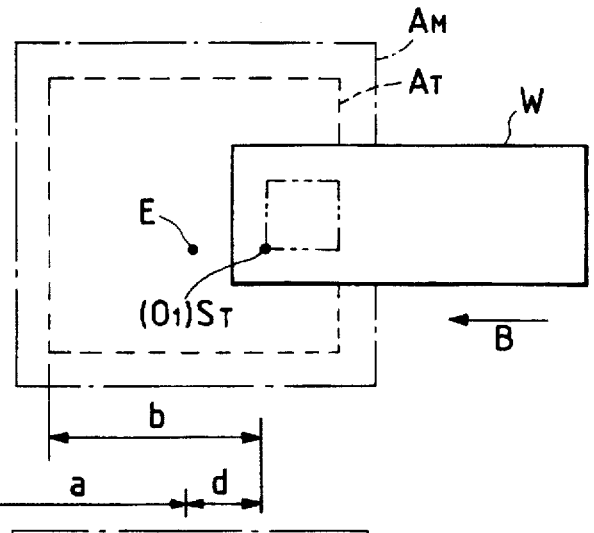
Figure 5C:
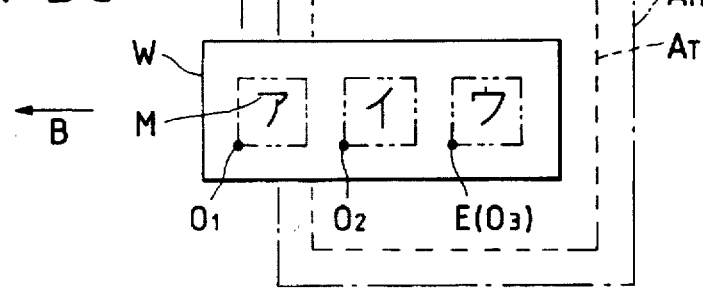

FIGS. 5A to 5C show a second embodiment of the invention.

In the second embodiment, the conveying speed v is not uniform, or unknown. In the second embodiment, a position sensor 30 is provided as indicated by the broken line in FIGS. 5B and 5C. The position sensor 30 outputs a position pulse signal as shown in FIG. 5A whenever the conveying surface moves a predetermined distance, irrespective of the conveying speed v of the conveying device 6.

If it is assumed that the position pulses signals are produced with pulse intervals $t_1, t_2, \ldots$, then the time T required for the workpiece W to move a predetermined distance L=a+d; namely, a target time T can be expressed by the following Equation (4):

$$T = t_1 + t_2 + \ldots + t_{L/L1} \qquad (4)$$

where L1 is the amount of movement of the workpiece per pulse.

Figure 3D:
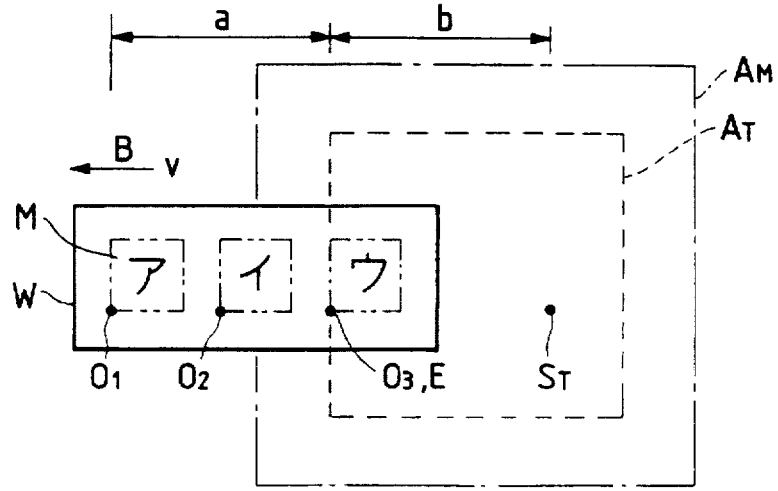

Since the conveying speed v is not uniform, the individual scanning speeds S are set so that the marking operation is accomplished while the workpiece is moving a distance L=(a+d) which is shorter than the distance L=(a+b) in FIG. 3D. Hence, even if the conveying speed v is increased, the marking operation may last longer by as much as the difference (b–d) than in the case of FIGS. 3A to 3D.

In this case, the individual scanning speeds S are obtained from the following Equation (5):

$$S = S_0 T_0/(t_1+t_2+ \ldots +t_{L/L1}) \quad (5)$$

FIGS. 6A to 6B show one modification of the second embodiment, in which the direction of conveyance B is perpendicular to that in the second embodiment shown in FIGS. 5A to 5C.

In the modification, the marking operation is started when the mark reference point $O_1$ shown in FIG. 6A reaches the irradiation start point $S_T$, and it is ended when the mark reference point $O_7$ shown in FIG. 6B reaches the irradiation end point E. In the modification, the individual scanning speeds S are obtained from the following Equation (6):

$$S = S_0 \times T_0/(t_1+t_2+ \ldots +t_{L/L1}) \quad (6)$$

where $L = a_1 + h$

In the above-described embodiments, the workpiece W (FIG. 1) is moved during the marking operation; however, the technical concept of the invention may be applied to the case where the workpiece W is held at rest. For instance, in the case where the conveying device 6 is able to intermittently convey the workpiece W, and after the workpiece W enters the maximum area $A_M$, the conveying device 6 is stopped for a predetermined time, and the marking operation is carried out during the predetermined time; the scanning speeds may be set most suitably for the predetermined time for which the conveying device is held stopped. In this case, the target time T is set shorter than the time for which the workpiece W is held stopped. Furthermore, the technical concept of the invention may be applied to the case where workpieces W are automatically supplied to the laser marking device one at a time, and the scanning speeds should be set most suitably for the workpiece supply cycle. As is apparent from the above description, the target time T should be set equal to or shorter than the time which is allowed for the marking operation.

Furthermore, in the above-described embodiments, a mark of "アイウアイウアイウ" has a plurality of mark reference points $O_1$ through $O_N$ as shown in FIGS. 3A to 3D; however, the invention is not limited thereto or thereby. That is, the technical concept of the invention is applicable to the case where a mark has only one mark reference point ($O_1$). In this case, the laser marking device is modified so that the marking operation is accomplished within the period of time which elapses from the time instant the mark reference point $O_1$ shown in FIG. 3C reaches the irradiation start point $S_T$ until it reaches the irradiation end point E.

The amount of movement L is (a+b) in the first embodiment shown in FIGS. 3A to 3D, and it is (a+d) in the second embodiment shown in FIGS. 5A to 5C. However, it should be noted that the amount of movement L may be set to a suitable value in the following range:

$$(a+d) \leq L \leq (a+b).$$

A third embodiment of the invention will be described with reference to the accompanying drawings.

As shown in FIG. 7, objects 181 are conveyed in one direction by a conveying stand 141. The conveying speed is for instance 40 m/min. The conveying stand 141 is provided with a position detector 142 made up of a rotary encoder or the like, to measure the amount of movement (distance) of an object 181. The position detector 142 outputs encoder pulses P according to the movement of the conveying stand as shown in the part (a) of FIG. 8.

A marking head 180 including a $CO_2$ laser and an optical scanning system is set above the conveying stand 141 with the aid of a supporting arm 143. The marking head 180 has a beam outlet directed towards the object 181.

The marking head 180 is connected to a controller 140 (described later), to control the on/off operation of the $CO_2$ laser and the beam deflecting operation of the optical scanning system. The laser scanning speed of the marking head 180 is for instance 3000 m/sec.

The position detection signal outputted by the position detector 142 is applied to the controller 140, so as to allow the latter to control the optical scanning system.

Figure 9:
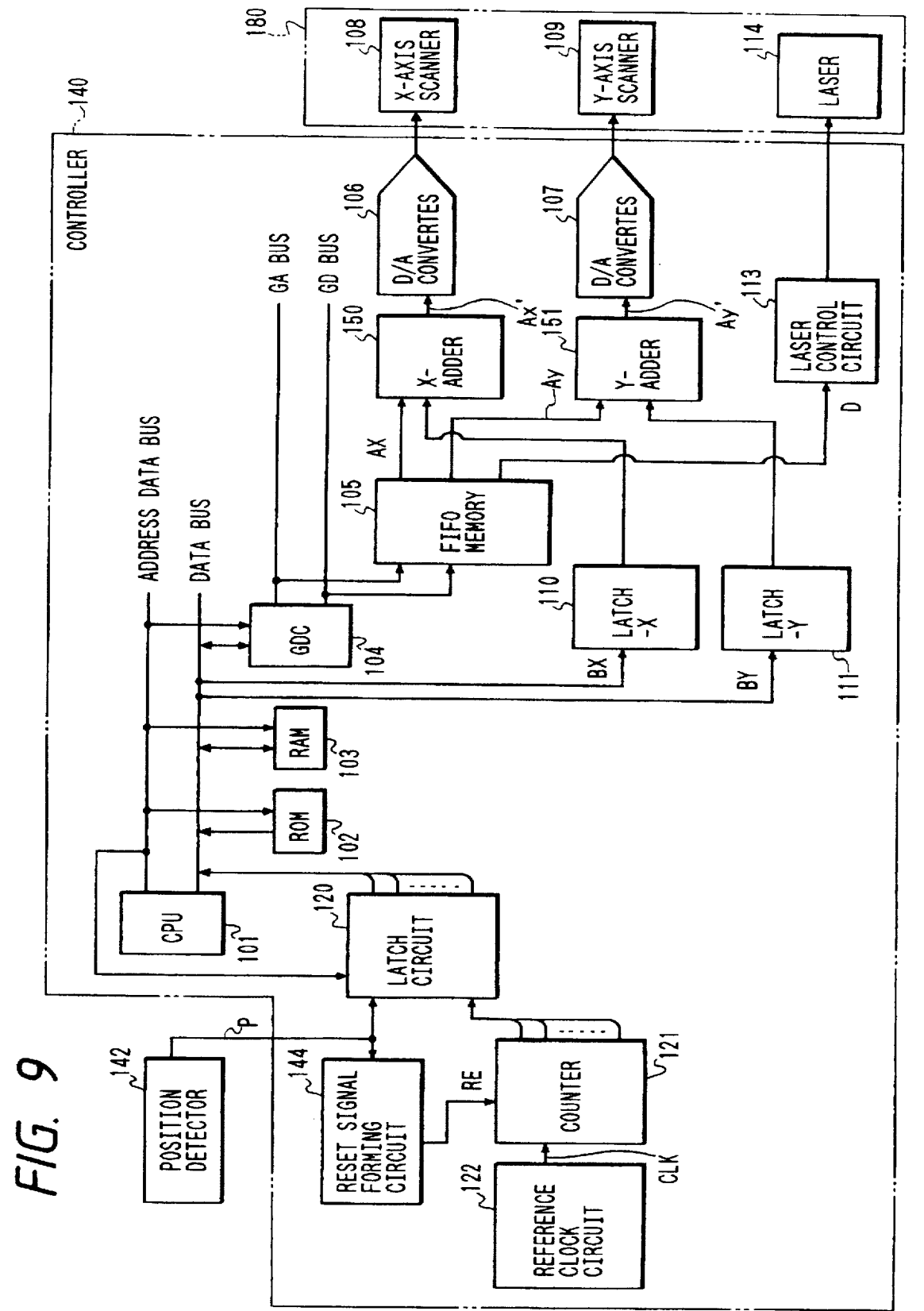
FIG. 9 is a block diagram of the internal arrangement of a controller in the device of the invention.

FIG. 9 shows the internal arrangement of the controller 140. As shown in FIG. 9, a CPU 101 has an address bus line and a data bus line which are connected to a ROM 102 and a RAM 103, and to a GDC (graphic display controller) 104 made up of a graphic LSI. The GDC 104 may be one "μPC72123" manufactured by NEC Company.

Graphic data on a plurality of line elements forming a variety of graphic forms have been stored in the ROM 102. The graphic data include various line elements (straight lines, ellipses, etc.), the coordinates of the start and end points of each of the line elements, and the coordinates of the center of, and the lengths of, the major and minor axes of each of the ellipses. The graphic data further include laser on/off basic data for turning on and off the laser respectively at the start and end of each of the line elements.

The CPU 101 executes a computer program stored in the ROM 102, to form a graphic-form describing command including the above-described graphic data, and applies it to the GDC 104. In response to a graphic-form describing command for a line element from the CPU 101, the GDC 104 calculates the coordinate data of a number of locus points between the start and end point of the line element according to the command, and calculates laser on/off data corresponding to the locus points according to the aforementioned laser on/off basic data. The data outputting speed of the GDC 104 is such that, for instance in the case of describing one straight line, one coordinate data outputting time is 0.2 μs. That is, the data outputting speed of the GDC 104 is much higher than the operating speed (5.0 μs or more per coordinate point) of an X-axis scanner or a Y-axis scanner (described later).

The coordinate data and the laser on/off data provided by the GDC 104 are applied respectively through a graphic address bus line GA and a graphic data bus line GD to an FIFO (first-in first-out) memory 105.

The FIFO memory 105 is able to store data on sixty-four (64) locus points for instance. Those data are sequentially stored in addresses, respectively, and are read from them at a constant rate.

Among the data read out of the FIFO memory 105 at the constant rate, X-axis coordinate data Ax are applied to a first input terminal of an X-adder 150, and Y-axis coordinate data Ay are applied to a first input terminal of a Y-adder 151.

The laser on/off data D read from the FIFO memory 105 is applied to a laser control circuit 113, where it is utilized to form a control signal for on-off control of a $CO_2$ laser 114.

On the other hand, the encoder pulse P provided by the position detector 142 is applied to the timing signal input terminals of a latch circuit 120 and of a reset signal forming circuit 144. The latch circuit 120 has a data input port which is connected through a counter 121 to a reference clock circuit 122. The counter 121 receives a reset signal RE from the reset signal forming circuit 144.

The counter 121, while being reset by the reset signal RE every period t of the encoder pulse P, counts the clock pulses CLK which the reference clock circuit 122 outputs for the period $t$ as shown in the part (b) of FIG. 8, and applies the count value to the latch circuit 120. When, under this condition, the CPU 101 applies a data read instruction through the address bus line to the latch circuit 120, the data latched in the latch circuit 120 is read into the CPU 101 through the data bus line. Thereupon, the CPU 101 calculates position correcting data Bx in the direction of X-axis (hereinafter referred to as "X-direction position correcting data Bx", when applicable) and position correcting data By in the direction of Y-axis (hereinafter referred to as "Y-axis position correcting data By", when applicable) as described later.

The data bus line of the CPU 101 is connected to a latch-X 110 adapted to latch the X-axis position correcting data Bx and to a latch-Y 111 adapted to latch the Y-axis position correcting data By. The output terminals of those latches 110 and 111 are connected to second input terminals of the X-adder 150 and of the Y-adder 151, respectively.

The output terminals of the X-adder 150 and the Y-adder 151 are connected through D/A (digital-to-analog) converters 106 and 107 to an X-axis scanner 108 and a Y-axis scanner 109, respectively.

Now, the operation of the laser marking device will be described with reference to the case where objects 181 are conveyed in the direction of X-axis by the conveying stand 141 as shown in FIG. 7.

The position detector 142 outputs an encoder pulse P as shown in the part (a) of FIG. 8 according to the movement of the conveying stand 141. The encoder pulse P is applied to the reset signal forming circuit 144, so that the counter 121 is reset. Immediately when rest, the counter 121 starts counting the clock pulses CLK provided by the reference clock circuit 122. The next encoder pulse P, when produced, is applied to the latch circuit 120, so that the count value of the counter 121 is latched by the latch circuit 120.

Thereafter, the CPU 101 makes access to the latch circuit 120 to fetch the count value. And the CPU 101 converts the count value into time to obtain the period $t$.

The CPU 101 further operates as follows: That is, the CPU 101 calculates the X-axis position correcting data Bx and the Y-axis position correcting data By. In the embodiment, the conveying stand 141 is moved in the direction of X-axis, and therefore the position correcting data By is zero (0). If it is assumed that the distance the object 181 moves for one period $t$ is represented by $h$, and the unitary scanning distance of the X-axis scanner; i.e., the pitch of dots forming the graphic pattern is represented by $f$, then the time g required for the object 81 to move as much as one dot pitch can be expressed by the following equation (7):

$$g = f(h/t) = (f/h) \times t \qquad (7)$$

Hence, in the case where the object 181 is moved in the positive direction of X-axis, a graphic form can be inscribed on the object 181 which is moving, by the following method: That is, for every time g, the position correcting data Bx for increasing the coordinate data as much as one (7) dot is calculated, and the X-axis scanner 108 is operated according to the corrected coordinate data which is obtained by adding the position correcting data to the original coordinate data.

In the circuit shown in FIG. 9, after the position correcting data Bx provided by the CPU 101 is latched by the latch 110, the position correcting data Bx is transmitted from the latch-X 110 to the X-adder 150 with the timing that the coordinate data Ax is applied from the FIFO memory 105 to the X-adder 150.

As a result, in the X-adder 150, the coordinate data Ax is added to the position correcting data Bx, to form corrected coordinate data Ax' which is applied through the D/A converter 106 to the X-axis scanner 108.

in the case where the object 181 is moved by the conveying stand 141 in the direction of the Y-axis, similarly as in the above-described case, the position correcting data By is calculated, and the Y-axis scanner 109 is operated according to corrected coordinate data which is obtained by adding the position correcting data By to the original coordinate data. That is, after the position correcting data Bx provided by the CPU 101 is latched by the latch-Y 111, the position correcting data By is transmitted from the latch-Y 111 to the Y-adder 151 with the timing that the coordinate data Ay is applied from the FIFO memory 105 to the Y-adder 151. As a result, the Y-adder 151 operates to add the coordinate data Ay to the position correcting data By, to form corrected coordinate data Ay' which is applied through the D/A converter 107 to the Y-axis scanner 108.

Figure 10:
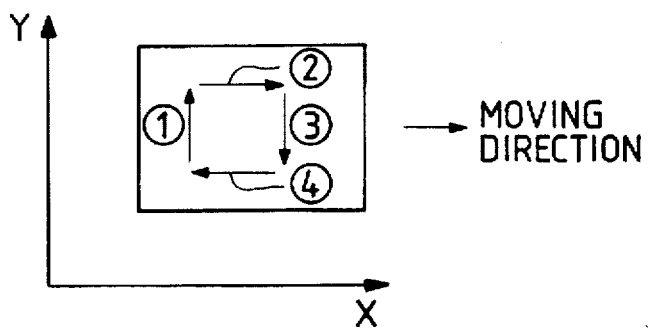
FIG. 10 is an explanatory diagram showing the direction of movement of an object and the scanning path of a scanner in the device of the invention.
Figure 11A:
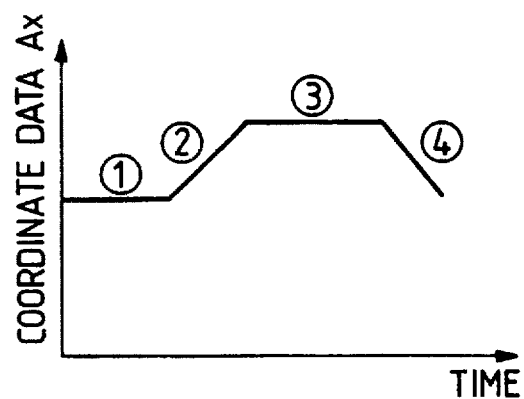
FIGS. 11A to 11C are graphical representations indicating coordinate data, object position, corrected coordinate data, respectively.
Figure 11B:
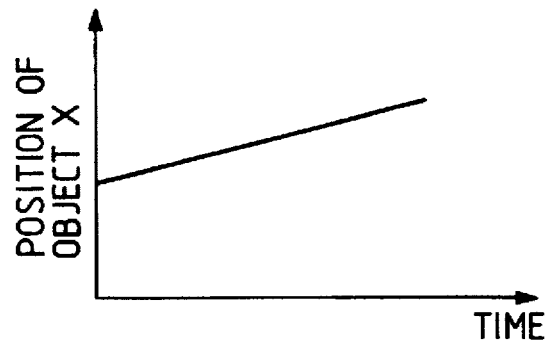
Figure 11C:
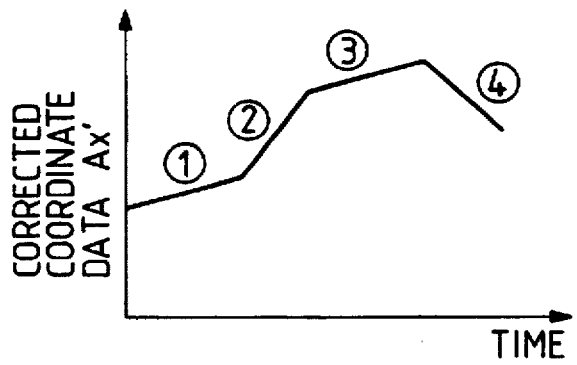

For instance in the case where, as shown in FIG. 10, the surface of the object 181 which is moved in the direction of the X-axis at a constant speed is scanned as indicated at (1), (2), (3) and (4) in the stated order, the coordinate data Ax changes in the direction of X-axis as shown in FIG. 11A. On the other hand, the position of the object 181 changes as shown in FIG. 11B. According to the change in position of the object 181, the aforementioned coordinate data Ax' is calculated. And the object is scanned in the direction of X-axis according to the data Ax' and thus calculated.

As a result, the graphic form shown in FIG. 10 is accurately inscribed on the surface of the object 181.

In the embodiment shown in FIG. 7, the position detector 142 is provided for the conveying stand 141 to detect the change in position of the object 181. However, in the case where the speed of movement of the object is known, the provision of the position detector 142 may be eliminated. That is, if it is assumed that the speed of movement of the conveying stand 141 is represented by $e$, then the time g, corresponding to that in the above-described equation (7), can be expressed by the following equation (8):

$$g = f/e \qquad (8)$$

Similarly as in the above-described case, the position correcting data is formed according to the time g, and then the corrected coordinate data is calculated.

As was described above, with the scan type laser marking device of the present invention, the scanning speed is so determined that the marking operation is started when the mark reference point reaches the irradiation start point located upstream as viewed in the direction of movement of the workpiece, and it is ended when the mark reference point reaches the irradiation end point. Hence, the marking operation can be achieved while the workpiece moves a relatively long distance. Accordingly, the scanning speed can be decreased when compared with the case where the scanning speed is fixedly set to a high value; that is, the scanning speed can be set to a suitable value. That is, with a low laser output, a mark can be inscribed on the workpiece within a given period of time which is high in picture quality.

With the scan type laser marking device of the invention, the time is measured which is required for the marking operation to be carried out with the reference scanning speed, and the individual scanning speeds are obtained according to the time thus measured, the reference scanning speed, and the target time. Hence, with the device, a mark high in picture quality can be inscribed on the workpiece by using suitable individual scanning speeds, which can be readily obtained.

In the scan type laser marking device of the invention, the target area is provided inside the maximum area. The marking operation is normally carried out in the target area so that a mark high in picture quality is formed on the workpiece. And even in the case where a marking operation is forced to be performed outside the target area because the workpiece conveying speed is not uniform, the mark can be inscribed on the workpiece.

While the above has been described in connection with the preferred embodiment of this invention, it is to be clearly understood that this description is made by way of example and not as a limitation on the scope of invention. In addition, it will be obvious to those skilled in the art that various changes and modifications may be made therein without departing from the invention.

What is claimed is:

1. A scan type laser marking device which scans the surface of an object conveyed in a predetermined area and applies a laser beam to the surface of the object to form a mark on the surface of the object, said scan type laser marking device comprising:

an area storing section for storing the area;

a start point coordinate storing section for storing coordinates of an irradiation start point in the area, the irradiation start point being located upstream relating to the direction of conveyance of the object;

an end point coordinate storing section for storing coordinates of an irradiation end point in the area, the irradiation being located downstream relating to the direction of conveyance of the object;

a mark reference point section for storing the coordinates of a reference point on the mark; and speed setting means for setting scanning speeds so that a marking operation is started when the mark reference point reaches the irradiation start point, and is ended when the mark reference point reaches the irradiation end point.

2. A scan type laser marking device according to claim 1, wherein a conveyance distance of the object during the marking operation satisfies following equations:

$$(a+d) \leq L \leq (a+b), \text{ and}$$

$$b = c - d,$$

where L is the conveyance distance of the object; a is a length from a front line of the frontmost mark to a rear line of the rearmost mark; c is a length of the area relating to the direction of conveyance of the object; and d is a length of the mark.

3. A scan type laser marking device which scans the surface of an object conveyed in a predetermined area and applies a laser beam on the surface of the object to form a mark on the surface of the object, said scan type laser marking device comprising:

measuring means for measuring a time which is required for performing a marking operation with a reference scanning speed; and scanning speed calculating means for utilizing the time thus measured, a marking target time, and said reference scanning speed to calculate individual scanning speeds which are to be actually used.

4. A scan type laser marking device according to claim 3, wherein the target time is set as a value that the object is conveyed a distance L, and wherein L satisfies following equations:

$$(a+d) \leq L \leq (a+b), \text{ and}$$

$$b = c - d,$$

where a is a length from a front line of the frontmost mark to a rear line of the rearmost mark; c is a length of the area relating to the direction of conveyance of the object; and d is a length of the mark.

5. A scan type laser marking device which scans the surface of an object conveyed in a predetermined area and applies a laser beam on the surface of the object to form a mark on the surface of the object, said scanning type laser marking device comprising:

a maximum area storing section for storing a maximum area where a marking operation is allowed;

a target area storing section for storing a target area smaller than the maximum area; and speed setting means for setting a scanning speed so that a marking operation is accomplished within the target area.

6. A scan type laser marking device according to claim 5, wherein a conveyance distance of the object during the marking operation satisfies following equations:

$$(a+d) \leq L \leq (a+b), \text{ and}$$

$$b = c - d,$$

where L is the conveyance distance of the object; a is a length from a front line of the frontmost mark to a rear line of the rearmost mark; c is a length of the target area relating to the direction of conveyance of the object; and d is a length of the mark.

7. A scan type laser marking device which, while applying a laser beam to the surface of a moving object, scans the laser beam two-dimensionally to inscribe graphic forms having a plurality of dots, said laser marking device comprising:

a laser source emitting the laser beam;

an optical scanning system for deflecting two-dimensionally the laser beam emitted by said laser source;

a control system for controlling the operation of said optical scanning system; and means for inputting displacement data on a displacement of the object, said control system including:
   coordinate producing means for producing coordinate data on the dots forming the graphic form; and
   coordinate correcting means for correcting, according to the displacement data, the coordinate data by the amount of the displacement of the object in the direction of displacement thereof, wherein the coordinate data corrected by said coordinate correcting means is applied to said optical scanning system.

8. A scan type laser marking device which scans the surface of an object conveyed in a predetermined area and applies a laser beam to the surface of the object to form a mark on the surface of the object, said scan type laser marking device comprising:

an input device coupled to a control means through an interface, to input coordinates representing configuration and reference points of a mark;

an area storing section for storing the area;

a start point coordinate storing section for storing coordinates of an irradiation start point in the area, the irradiation start point being located upstream relating to the direction of conveyance of the object;

an end point coordinate storing section for storing coordinates of an irradiation end point in the area, the irradiation being located downstream relating to the direction of conveyance of the object;

a mark reference point section for storing the coordinates of a reference point on the mark;

a scanning speed storage section to store a plurality of individual scanning speeds and a reference scanning speed;

a control section which controls an optical system driving device and a drive power service circuit;

relative coordinate calculating means for transforming the coordinates of the mark and the reference points of the mark into relative coordinates which are irradiated by the laser beam in the area;

measuring means for measuring a time which is required for performing a marking operation with the reference scanning speed; and speed setting means for setting scanning speeds so that a marking operation is started when the mark reference point reaches the irradiation start point, and is ended when the mark reference point reaches the irradiation end point.

* * * * *